June 26, 1945.  D. M. TERRY  2,379,262

ELECTRIC CONTROL CIRCUIT

Filed March 31, 1943   3 Sheets-Sheet 1

INVENTOR
D. M. TERRY

BY
Earl C. Laughlin
ATTORNEY

INVENTOR
D. M. TERRY
BY
Earl C. Laughlin
ATTORNEY

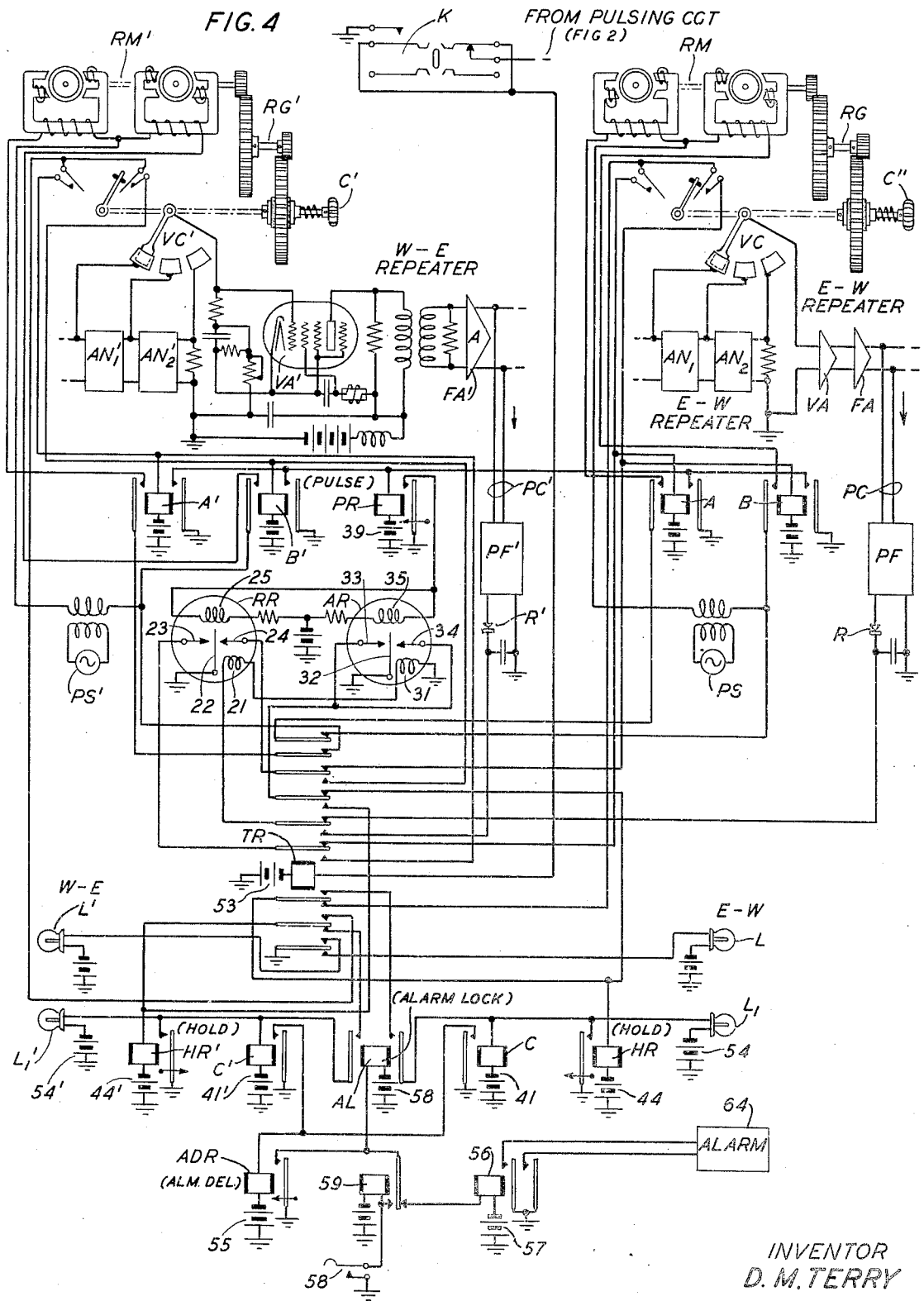

Patented June 26, 1945

2,379,262

UNITED STATES PATENT OFFICE 2,379,262

ELECTRIC CONTROL CIRCUIT

Donald M. Terry, Brooklyn, N. Y., assignor to Bell Telephone Laboratories, Incorporated, New York, N. Y., a corporation of New York Application March 31, 1943, Serial No. 481,192

6 Claims. (Cl. 175—320)

The invention relates to electric circuits and particularly to electric control circuits employing gas discharge tubes, and to applications of such control circuits.

An object of the invention is to produce simply and accurately a delay in the operation or release of an electric circuit or device ranging from a fraction of a second to several minutes.

Another object is to generate identical electric pulses in a particular time sequence for control purposes.

Another object is to produce switching operations at accurately timed intervals.

These objects are attained in accordance with the invention by simple circuit arrangements employing comparatively few and inexpensive circuit elements including a starting switch, a cold cathode gas discharge tube with an associated condenser-resistance timing circuit and a battery for effecting breakdown of the tube a definite time after the starting switch has been actuated, a relay operating in response to the breakdown of the tube to effect operation or release of the circuit or device to be controlled with the required delay, and to cause the discharge of the condenser in the timing circuit, and means controlled by the starting switch to restore the gas tube to normal and thus terminate the relay operation.

Modifications of the invention include a circuit arrangement comprising two cold cathode gas discharge tubes, each with an associated condenser-resistance timing circuit and a controlled relay, combined with a starting switch and a single battery, to produce electric pulses in a desired time sequence; and a switching arrangement in which such a pulsing circuit is used to control the switching of control elements of an automatic repeater gain adjusting and alarm circuit from one side of a two-way signal repeater to the other at predetermined times to enable the required gain adjustment of the repeater and alarm indications to be obtained for both directions of transmission with the use of only one set of control elements.

The various objects and features of the invention will be better understood from the following detailed description when read in conjunction with the accompanying drawings, in which.

Figure 1:
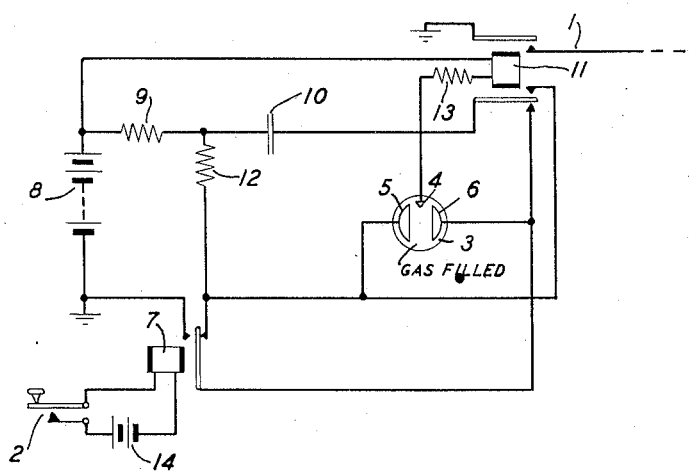
Fig. 1 shows schematically a time delay circuit embodying one form of the invention.
Figure 2:
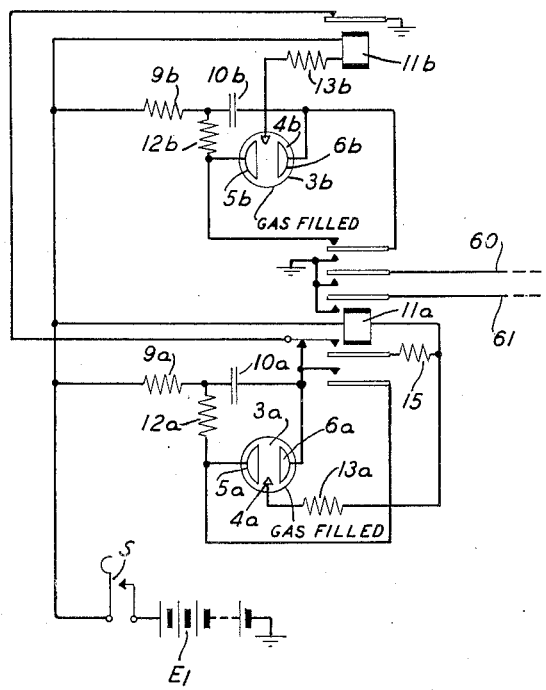
Fig. 2 shows schematically a pulsing circuit embodying the invention.
Figure 3:
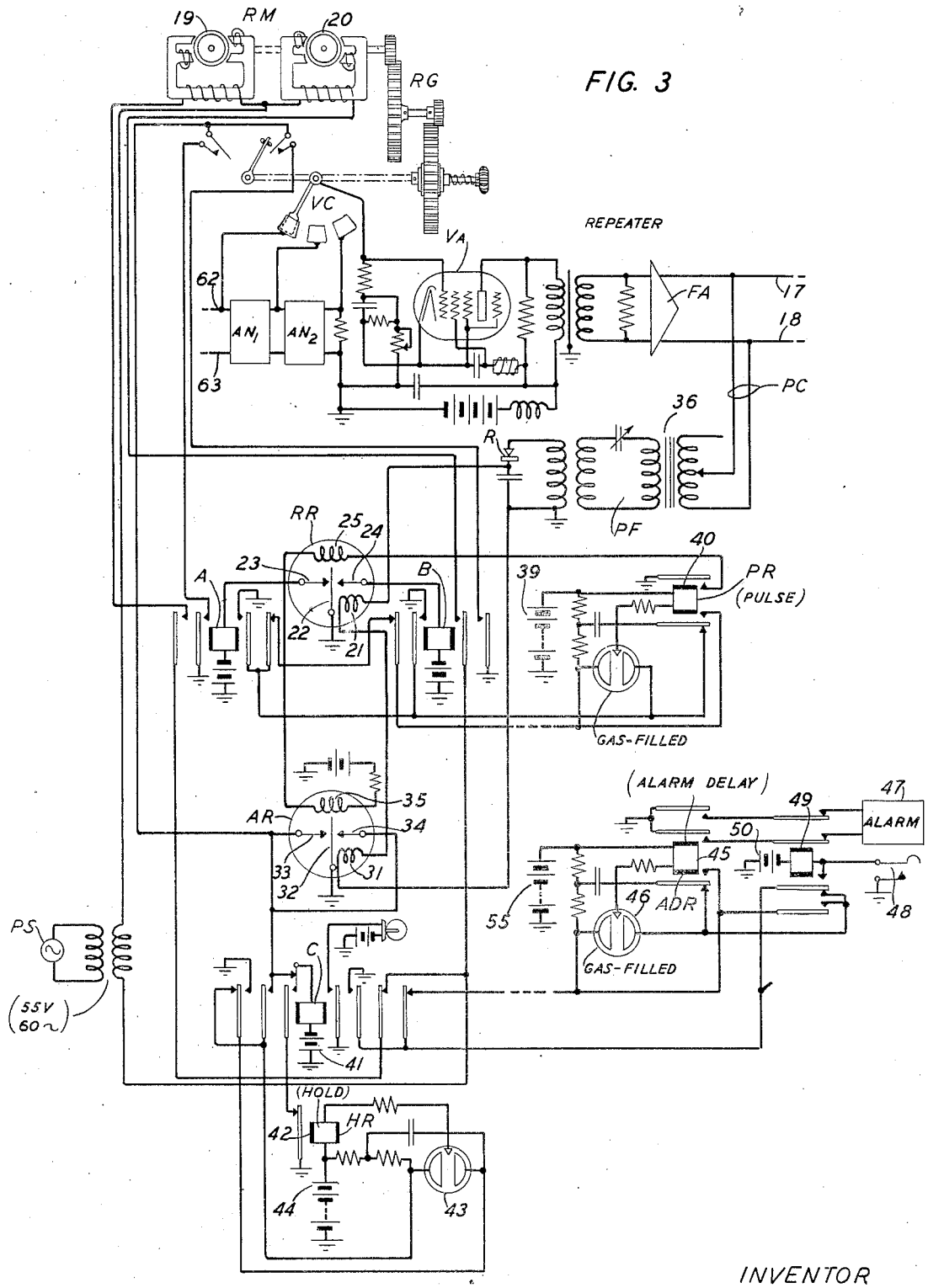

Fig. 3 shows schematically the application of delay circuits such as shown in Fig. 1 to an automatic repeater gain adjusting and alarm circuit to provide desired slow-operate and slow-release control operations; and Fig. 4 shows schematically a circuit for switching the control elements of an automatic repeater gain adjusting and alarm circuit from one side of a two-way repeater to the other, adapted for control by the pulsing circuit of the invention shown in Fig. 2.

Fig. 1 shows a time delay circuit in accordance with the invention for obtaining any desired amount of time delay, which may range from fractions of a second to several minutes, in the operation or release of a circuit 1, indicated diagrammatically, after the actuation of a starting switch or key 2.

The circuit of Fig. 1 includes as main elements, the gas-filled "trigger" discharge tube 3 of known type having an anode 4, a control anode 5 and a cathode 6; the battery 8; the resistance 9 and condenser 10, the values of which, for a particular tube and given battery potential, determine the delay time of the circuit, which in conjunction with the battery 8 controls the breakdown of the tube 3 with the desired delay after the switch 2 is actuated; the relay 11 operating in response to breakdown of tube 3 to actuate circuit 1; and the relay 7 controlled by switch 2, which when operated starts the charging of the condenser 10 and when released restores tube 3 to the unoperated condition terminating the actuation of circuit 1.

A protective short-circuiting connection across the control discharge gap between electrodes 5 and 6, through the normally closed back contacts of unoperated relay 7, normally maintains that tube in the deionized condition. The positive terminal of the direct current battery 8 of voltage E (say, 130 volts) is connected to the control anode 5 of tube 3 through the resistances 9 and 12 in series. When relay 7 is operated, the negative (ground) side of battery 8 is connected to cathode 6 and through back contact of relay 11 to one side of condenser 10. The other side of this condenser connects through high resistance 9 to the positive side of battery 8.

When the starting key 2 is actuated, energizing current is supplied from the direct current source 14 to the winding of relay 7 causing the operation of that relay to first open its back contacts and then to close its front contacts. The opening of the back contacts of relay 7 removes the protective short-circuit across the control discharge gap of tube 3. The closing of the front contacts of relay 7 connects battery 8 across the series connection of resistance 9 and capacitor 10 (which is connected across the control discharge gap between electrodes 5 and 6 of tube 3) so as to start the gradual charging of the capacitor 10 through the resistance 9 by the current flowing from that battery. When the voltage $e_c$ across capacitor 10 builds up to a voltage $E_c$ (equals 75 volts on the average with the particular tube used), the control discharge gap between electrodes 5 and 6 will break down, which, in turn, will cause the main discharge gap between electrodes 4 and 6 to break down. The resultant flow of current through the tube and the external anode-cathode circuit will cause the operation of relay 11 in the latter circuit. Closing of the upper contacts of this relay initiates the operation or release of the circuit 1. This thus takes place a definite time after the actuation of starting key 2, determined by the circuit constants. The relay 11 by operating also opens its lower back contacts and closes its lower front contacts.

The tube currents are limited to safe values by proper selection of the values of the protective resistances 12 and 13 in circuit with the control and main discharge gaps, respectively, of the tube. The operation of relay 11 to open its lower back contact and close its lower front contact will disconnect the condenser 10 from the negative terminal of battery 8 and will connect the resistance 12 in shunt with that condenser. The condenser 10 will then discharge through the shunting resistance 12, and this discharge, if uncompleted, will continue when relay 7 releases (due to the opening of starting key 2) to reconnect the protective short-circuit across the tube electrodes 5 and 6 through the closed back contacts of the relay 7. The instant the front contact of relay 7 opens to disconnect the battery 8, the breakdown of tube 3 will be terminated causing the immediate release of the relay 11. The circuit will then be in its normal condition adapted for another cycle of operations as described above when the starting key 2 is again actuated.

The voltage across the capacitor 10 before the breakdown of tube 3 is given by the equation:

$$e_c = E\left(1 - \epsilon^{\frac{-t}{RC}}\right) \quad (1)$$

where $t$ is the delay time in seconds, R the resistance value of resistance 9 in megohms, C the capacitance of capacitor 10 in microfarads, and E the voltage of battery 8. At breakdown of tube 3 for which $e_c = E_c$ (the voltage required to break down the control gap), the operating delay time of the circuit of Fig. 1 is given by the equation:

$$t = -RC \log \epsilon \left(\frac{E - E_c}{E}\right) \quad (2)$$

Thus, for given conditions the delay time $t$ in seconds is directly proportional to the product RC, where R is the value in megohms of the resistance 9 and C is the capacitance in microfarads of the condenser 10. Where E equals 130 volts and $E_c$ equals 75 volts, $t$ equals 0.86 RC. With the circuit constants of the arrangement of Fig. 1 properly selected, any time delay from a fraction of a second to several minutes may be conveniently obtained.

Fig. 2 shows a circuit arrangement for producing a continuous succession of ground pulses for alternately operating and releasing a relay or other control device (not shown in this figure) for predetermined intervals of time which may be made of desired equal or unequal time durations by proper choice of circuit constants. The circuit employs in combination with the single control battery $E_1$ and a starting switch S, two cold cathode gas discharge tubes each with an associated condenser-resistance time delay circuit and an electromagnetic relay operatively energized in response to breakdown of the tube, such as shown in the time delay circuit of Fig. 1 as indicated by the use of the same characters for identifying corresponding circuit elements in the two figures, except that the characters in Fig. 2 have the subscripts $a$ and $b$ for the elements in the respective two gas tube-condenser-resistance-relay combinations. One of the cold cathode tube circuits is used to furnish the marking time and the other the spacing time of the pulses transmitted to the device to be controlled, and it will be assumed that the marking and spacing times are made of equal duration, say two-minute intervals for each, by using equivalent tubes and by making the RC constants of their associated circuit elements of proper and equal values.

The operation of the pulsing circuit of Fig. 2 is as follows: Upon actuation of the starting switch S to connect the 130-volt battery $E_1$ to the circuit, a completed circuit to ground from the back contact of relay $11_b$ connects the battery across the series combination of resistance $9_a$ and condenser $10_a$ to start the charging of the latter. When the condenser $10_a$ is charged to a given potential $E_c$, the control discharge gap between tube electrodes $5_a$ and $6_a$ will break down which, in turn, will cause the main discharge gap between the tube electrodes $4_a$ and $6_a$ to break down to complete the operation of tube $3_a$. Relay $11_a$ in the anode circuit of tube $3_a$ will be immediately operated by the resultant flow of current through the tube, this operation taking place in a given time interval (two minutes after the actuation of the starting switch S determined by the selected constants of the tube and associated circuit elements). Relay $11_a$, in operating, locks operated through resistance 15 (provided to keep the relay current at approximately the same value), one of the lower contacts and ground still obtained from the break contact of relay $11_b$.

When relay $11_a$ has operated to close its lower contacts, the breaking of a normal make contact causes ground to be removed from the cathode $6_a$ of tube $3_a$ restoring that tube to the deionized condition, and the resistance (0.12 megohm) $12_a$ is connected across condenser $10_a$ to provide a discharge path for that condenser. The operation of relay $11_a$ to close its upper front contacts causes ground to be connected to the pulse leads 60, 61; removes the normal protective short-circuit on the control discharge gap between electrodes $5_b$ and $6_b$ of the gas tube $3_b$; and connects a charging circuit for condenser $10_b$ through resistance $9_b$ from battery $E_1$. When the condenser $10_b$ charges up to the necessary voltage, first the control discharge gap and then the main discharge gap of the tube $3_b$ will break down, causing the relay $11_b$ in the output circuit of that tube to be operatively energized a given time (two minutes) after control relay $11_a$ has operated.

The operation of relay $11_b$ to open its contacts will remove ground from the winding of relay $11_a$.

The latter relay will then release to remove ground from the pulse leads 60, 61 and to remove operating ground from tube 3b so that it is almost immediately restored to the deionized condition. This in turn causes the release of relay 11b. Thus, relay 11b would be operated for a fraction of a second only. The discharge of the condenser 10b in the circuit of tube 3b takes place with the relay 11a in its unoperated position, likewise through the resistance (0.12 megohm) 12b during the time interval (two minutes) that relay 11a is in the released condition. The cycle then is repeated with tube 3a and then tube 3b operating. Relay 11a is thus alternately operated and released for predetermined intervals (two minutes each). The two make contacts to ground from relay 11a providing the ground pulses for operating a relay or other device to be controlled are used in order to divide the load.

Fig. 3 shows the use of delay circuits such as described in connection with Fig. 1 to obtain a 4-second slow-operate, a 25-second slow-operate and a 4-second effective slow-release time required for various control operations in a pilot-controlled gain-control and alarm circuit. Such circuits are employed in carrier telephone systems for regulating the gain of repeaters and the receiving circuit at terminals to compensate for variations in attenuation of the preceding section of line with weather conditions, and for giving alarms to indicate abnormal variations existing for an extended period of time caused by severe trouble in the system.

In Fig. 3, a portion of the transmission line representing one channel of a repeater station receiving speech side-band currents and pilot currents of suitable frequency outside the signal frequency range over the preceding section of line, is indicated as having input conductors 62 and 63 and output conductors 17 and 18. Between the input and output conductors is interposed a variable gain amplifier stage VA followed by a fixed gain amplifier stage FA. Two attenuation networks AN1 and AN2, which may be of the type disclosed in the patent to R. W. Chesnut, No. 1,880,800, issued October 4, 1932, are provided in the transmission line in front of the amplifier stage VA for effectively adjusting its gain in accordance with the adjustment of the associated variable condenser VC.

The variable condenser VC is operated through the reduction gearing RG in a manner similar to that described in my Patent No. 2,084,115, issued June 15, 1937, in connection with a similar arrangement, by the oppositely rotating synchronous motors 19 and 20 of the regulating motor arrangement RM controlled from a 55-volt, 60-cycle alternating current power supply PS to respectively raise and lower the effective gain of the amplifier stage VA. The synchronous motors 19 and 20 are respectively driven by the two relays A and B under control of the sensitive regulating relay RR when the latter is operated in one direction or the other.

The regulating relay RR comprises an operating coil 21, a contact arm 22 adapted to be moved into engagement with stationary contact member 23 or 24 which members are in the form of small permanent magnets which engage and hold an armature on the contact arm 22 whenever the latter is moved under control of the operating coil 21 to the near proximity of either of its two operated positions; and a restoring coil 25 operating to restore the contact arm or pointer 22 to its initial neutral position whenever the latter coil is energized.

The sensitive (Alarm) relay AR, similar to the relay RR but of lower sensitivity, has an operating coil 31, a restoring coil 35, and a contact arm or pointer 32 movable into engagement either with stationary contact member 33 or stationary contact member 34, under control of the operating coil 31, or to a neutral position under control of its restoring coil 35.

The operating coil 21 of the regulating control relay RR and the operating coil 31 of the alarm control relay AR are energized in series from the rectified pilot current output of the control circuit PC having its high impedance input connected across the line in the output of the amplifier stage FA by transformer 36. The control circuit PC includes in its input a narrow band filter PF for selecting the pilot frequency from the output of amplifier stage FA, and a copper-oxide varistor R for rectifying the selected pilot current.

The regulating relay RR is properly designed so that its contact arm 22 will be moved either to the left contact 23 or to the right contact 24 in response to the rectified current applied to its operating coil 21 when the pilot current supplied to the control circuit PC changes by 0.5 decibel in either direction from its normal level due to variations in attenuation of the section of transmission line preceding the amplifier. When the movable arm 22 of regulating relay RR is moved to contact 23, it closes an energizing circuit for relay A from battery and when it is moved to contact 24 it closes an energizing circuit for relay B from the associated battery. The resultant operation of the relay A or B effects contacts to drive the regulator motors 19 and 20 in the proper direction to adjust the regulating condenser VC through the reduction gearing RG in the proper direction and amount of return the pilot current at the output of the repeater to normal level, thus effectively compensating for the variation in line attenuation.

The change in regulation is effected through successive operation periods of the regulating motors 19 and 20 under control of the regulating relay RR until the resulting change in gain of the amplifier stage VA is sufficient to restore the pilot current in the output of the repeater or receiving terminal to normal level. These periods are timed by the slow-operate (Pulse) cold cathode tube delay circuit 40 which is identical with the circuit of Fig. 1 and has its circuit constants selected to provide the desired delay time (four seconds) in the operation of the (Pulse) relay PR. The operation of the (Pulse) delay circuit 40 is initiated by operation either of the relay A or the relay B depending on the direction of the change in gain to be made, which relay would correspond to the starting relay 7 in the circuit of Fig. 1. A given time interval (four seconds) after relay A or B has operated, the pulse relay PR in the circuit 40 will operate to close an energizing circuit from battery 39 to the restoring windings 25 and 35 of relays RR and AR, respectively, in series, causing the pointers of the latter relays to be returned to the central neutral position. This will cause the release of the operated relay A or B, which in turn will result in the release of the pulse relay PR. The restoring mechanism of the relays RR and AR is then released allowing the pointers of these relays to be again moved toward either contact position under control of the energizing current supplied to their operating coils from the rectified pilot current output of the control circuit PC, to again operate relay A or relay B, depending on the direction of gain change to be made, to start the regulating motors RM to make another change in amplifier gain, and to initiate operation of the pulse delay circuit 40. This pulsing operation will continue until sufficient gain correction has been made in the amplifier VA to bring the level of the pilot current back to normal.

The sensitive relay AR is adjusted so that it will operate only in response to a sudden large change in the level of the pilot current, that is, a sudden decrease from the normal value by 5 decibels or more or a sudden increase from the normal value of 3 decibels or more. When such a sudden change occurs the movable arm or pointer 32 moves either to the stationary contact 33 or the stationary contact 34, depending on the direction of the change. The closing of either contact will complete an energizing circuit for the relay C from battery 41 causing the operation of that relay.

The operation of relay C through its left-hand contacts completes a locking circuit for itself through the normally closed contact of hold relay HR in the anode circuit of the (Hold) cold cathode gas discharge tube of time delay circuit 42 which is like the circuit of Fig. 1; removes the normal protective short-circuit across the control discharge gap of the cold cathode gas tube 43 in the time delay circuit 42; supplies ground to the cathode of that tube; and connects ground to the control anode of the tube 43 through the operated contact of alarm control relay AR, which prevents the direct ground on the cathode from causing operation of the tube to energize the (Hold) relay HR in its anode circuit from battery 44 until the alarm level has been restored as indicated by an interval of four seconds without recontacting after the alarm control relay AR releases in response to energization of its restoring coil 35 by operation of pulse relay PR. At such time when the (Hold) gas tube 43 breaks down, operation of the (Hold) relay HR in its output breaks the locking energizing circuit for relay C causing the release of that relay to restore the alarm circuit to normal. The relay C, when operated, through its right-hand contacts opens the alternating current supply circuit of the regulating motors 19 and 20 stopping further gain regulation (in many cases the alternating current supply is cut off by the C relay for only connection through the A relay, not both A and B relays; this allows the gain to be reduced while level is in high alarm condition); and starts the operation of the (Alarm delay) cold cathode gas tube time delay circuit 45, similar to the time delay circuit shown in Fig. 1, to provide operation from battery 55 of the (Alarm delay) relay ADR in the anode circuit of the gas tube 46 only if the alarm condition continues, as evidenced by continuous operation of the relay C, for a time interval of 25 seconds (obtained by proper selection and arrangement of circuit constants of the condenser-resistance time delay circuit). The operation of the relay ADR through its upper contacts causes operation of the alarm device 47. The alarm may be silenced by operation of the non-locking manual key 48 which causes the relay 49 to be operated from battery 50, to lock operate from the alarm ground; to open its upper contacts breaking the energizing circuit for the alarm device 47 during the remaining portion of the alarm condition; and, through its operated lower contacts to cause the gas tube 46 in the alarm delay circuit 45 to be immediately restored to its normal unoperated condition thus preventing its unnecessary continuous operation.

Fig. 4 shows a switching circuit adapted for control by the pulsing circuit of Fig. 2 to switch at predetermined intervals an automatic repeater gain control and alarm circuit, similar to that described in connection with Fig. 3 in connection with a one-way repeating channel, back and forth from one side of a two-way repeater to the other so as to enable adjustment of repeater gain and alarm indication of abnormal transmission conditions for both directions of signal transmission with the use of less apparatus. Only the circuits and apparatus required to properly explain the operation of new features in accordance with the present invention will be described in detail.

In Fig. 4 are shown portions of the W—E (west-to-east) repeater and the E—W (east-to-west) repeater, so labeled, of a two-way repeater station for a carrier telephone system; each repeater including a variable condenser VC, VC' with associated attenuation networks $AN_1$, $AN_2$ and $AN_1'$ and $AN_2'$ in the input of a gain control amplifier stage VA, VA' for variably adjusting the gain of the repeater under control of the synchronized regulating motors RM, RM' through reduction gearing RG, RG'. The motors RM, RM' energized from an alternating power source PS, PS', are adapted for control from the output of either pilot-controlled circuit PC, PC', each including a pilot filter PF, PF' and a rectifier R, R', the inputs of which are respectively bridged across the outputs of the E—W repeater and the W—E repeater by apparatus substantially identical with that associated with the one-way repeater in the system of Fig. 3 described above. However, in the system of Fig. 4, a single set of sensitive regulating and alarm control relays RR and AR, corresponding to the similarly designated relays shown in Fig. 3, is alternately employed for controlling the operation of the synchronous motors RM, RM' to adjust the gain of the E—W and W—E repeaters, under control of the pilot current in the respective repeater channels, and for giving alarms indicating abnormal transmission conditions in the transmission line section preceding each repeater.

Individual switching relays A, B and A', B', corresponding to the similarly designated switching relays in the single repeater control circuit of Fig. 3, are respectively used for controlling the regulating motors RM, RM' of the E—W repeater and the W—E repeater under control of the sensitive regulating relay RR in the system of Fig. 4. A single slow-operating (Pulse) relay PR, corresponding to the similarly designated (Pulse) relay in the system of Fig. 3, shown for convenience as a slow-operating relay but which may have an associated cold cathode gas tube time delay circuit such as illustrated in connection with the similar relay of Fig. 3 to provide the required slow operation, is adapted for energization by operation of either relay A, B of the E—W repeater, or either relay A', B' of the W—E repeater to control the restoring mechanism of the sensitive relays RR and AR to provide the desired pulsing operation in controlling the repeater gain-adjusting and alarm operations described in connection with the system of Fig. 3.

One terminal of each of the restoring windings 25 and 35 of the regulating and alarm control relays RR and AR, respectively, are connected through an energizing battery to ground, and the other terminals of these windings are connected to the contact of the common (Pulse) relay PR of the automatic gain regulating and alarm circuit for the two repeaters. With the multiple contact transfer relay TR in the unoperated condition shown, the operating coils 21 and 31 for the regulating control relay RR and the alarm control relay AR, respectively, are connected in series through closed contacts of that relay across the output of the pilot rectifier R from the output of the E—W repeater. With the transfer relay TR unoperated, the stationary contacts 23 and 24 of the regulating control relay RR are respectively connected through other closed contacts of the transfer relay TR to terminals of the windings of relays A and B which operate to control the regulating motors RM of the E—W repeater in the manner above described for the similar arrangement of Fig. 3, the other terminals of the relays A and B being connected through the associated energizing batteries to ground; and the stationary contacts 33 and 34 of the alarm control relay AR are connected in parallel through other closed contacts of the transfer relay TR to one terminal of the slow-releasing (Hold) relay HR the other terminal of which is connected through the associated battery 44 to ground. These connections are such as to enable the pilot current in the output of the E—W repeater, when its level departs from normal as much as ±0.5 decibel, to control operation of the regulating control relay RR and thus of the associated relays A and B and the (Pulse) relay PR, the regulating motors RM and the variable condenser VC, in the manner described in detail in connection with the similar arrangement of Fig. 3, to produce repeated adjustments of the gain of the E—W repeater until its pilot current output is returned to normal level; and also to control operation of the alarm control relay AR and the associated relays and alarms to be referred to below to indicate any sudden decreases of 5 decibels or more or increases of 3 decibels or more in the pilot current from normal level indicating abnormal conditions in the line feeding the input of the E—W repeater.

When the transfer relay TR is operated, the normally made contacts of the relay referred to above are opened to effectively disconnect the regulating control relay RR and the alarm control relay AR from the pilot output circuit PC and gain-adjusting circuits for the E—W repeater, and other contacts are closed to connect the operating coils of the same relays and their switching contacts to the similar control and gain-adjusting circuits for the W—E repeater, identified by similar characters but followed by a prime (') mark. This will cause the relays RR and AR to control in a similar manner the adjustment of the gain of the latter repeater when the level of the pilot output current varies a given amount from normal and to control the operation of alarms to indicate sudden increases or decreases of the pilot current level such as will be caused by abnormal conditions in the line feeding that repeater.

With the key K is in the central position indicated, the operating winding of the transfer relay TR in series with the grounded battery 53 is connected to the pulse leads 60, 61 of the pulsing circuit of Fig. 2. Then, if the starting key S of the latter circuit is in the closed condition shown, the pulsing leads 60, 61 are alternately connected to and disconnected from ground through the contacts of relay 11a for time intervals of two minutes each. Thus, the transfer relay TR in Fig. 4 will be alternately operated and released to continuously switch the operating coils of the regulating control relay RR and of the alarm control relay AR, and the connections of the stationary contacts of these same relays back and forth between the automatic gain control and alarm circuits of the W—E and E—W repeaters, for intervals of two minutes each, so as to enable the automatic gain control and alarm operations described above to be made alternately in connection with each repeater for that time interval. The two-minute intervals should provide adequate time for completely effecting regulation which had been held up during the previous two-minute interval when connection was made to the other repeater (even during extreme pilot current level changes caused by the subjection of the preceding section of line to severe weather changes).

Indication of the particular repeater to which the regulating and alarm control relays RR and AR are connected at any time, if required, may be provided by the lamps L and L' associated with certain contacts of the transfer relay TR so that one lights up when relay TR is operated and the other lights up when that relay is unoperated. If an indication of pilot level on either side is desired while adjustment of the repeater gain on the other side is taking place, this may be obtained immediately by proper manual operation of the key K without having to await the end of a switching interval. Also, by manual operation of the key K to the right or left, steady operation of the automatic gain control and alarm circuit in connection with either repeater may be made. Manual adjustments of the gain of either repeater may be made at any time by proper turning of the control knobs C' or C" associated with the gain control condensers VC and VC', respectively.

The (Alarm lock) relay AL, not shown in the arrangement of Fig. 3, is required in the circuit arrangement of Fig. 4 to maintain an existing alarm indication for one repeater while the regulating and alarm control relays RR and AR are switched to the other repeater. This is operated in the following manner. Let it be assumed that the operating coils and the contacts of the regulating and alarm control relays RR and AR are associated with the controls of the E—W repeater as shown in the drawings. Then, if the level of the pilot current in the output of the E—W repeater suddenly increases or decreases in an amount sufficient to cause operation of the relatively insensitive alarm control relay AR, the movable arm 32 of that relay will be moved to the stationary contact 33 or 34 depending on the direction of the change. This will cause immediate operation of the slow-release (Hold) relay HR, corresponding to the similarly designated relay in Fig. 3, for the E—W repeater, from the associated battery 44 which will cause operating current to be supplied immediately from battery 54 to the alarm lamp L₁, and the relay C, corresponding to the similarly designated relay in Fig. 3, to be immediately operated by current from the associated battery 41. The operation of relay C will cause energizing current to be supplied to the winding of the slow-operating (ALM Delay) relay ADR from the associated battery 55, and the latter relay will be operated 25 seconds later to complete an operating circuit for the alarm relay 56 from the associated battery 57, and an operating circuit for the (ALM Lock) relay AL from the associated battery 58. Alarm relay 56 will operate to actuate the alarm device 64. The operation of the (ALM Lock) relay AL provides a holding circuit extending from ground through the make contact of the operated (Hold) relay HR through the made right-hand contacts on the (ALM Lock) relay AL and then through the made contacts on the transfer relay TR, after it has switched relays RR and AR to the W—E repeater, to the winding of the operated (Hold) relay HR and the associated battery 44 to ground.

The (Hold) relay HR is thus locked operated for the two-minute interval, maintaining the alarm indications controlled by it, until the transfer relay TR again operates to again place this (Hold) relay HR under control of the alarm control relay AR.

The operation is similar for the case where the regulating control relay RR and the alarm control relay AR are associated with the W—E repeater and are switched to the E—W repeater, in which case the operation of the (ALM Lock) relay AL caused by operation of the (ALM Delay) relay ADR, under control of relay C', will provide a holding circuit from ground through the operated make contact of the (Hold) relay HR' through the made left-hand contacts of the (ALM Lock) relay AL and then through closed contacts on the transfer relay TR, after it has switched relays RR and AR to the E—W repeater, to the winding of the operated (Hold) relay HR' which mainains the latter relay locked in the operated position for the two-minute interval, thus maintaining alarm indications on the W—E repeater, until the transfer relay TR again releases to place this (Hold) relay HR' again under control of the alarm control relay AR. Like in the system of Fig. 3, the alarm device 64, corresponding to the alarm device 47 of the latter figure may be silenced during an alarm condition by operating a manual key 58 to energize a relay 59 which, when it operates, breaks the energizing circuit for the alarm relay 56 causing the release of the latter relay to open the energizing circuit for the alarm device 64.

In the system of Fig. 4 the relays PR and ADR have been shown as slow-operating relays and the relays HR and HR' as slow-release relays. The desired slow action of these relays may be obtained by an associated cold cathode gas discharge tube delay circuit as in the system of Fig. 3.

Various other modifications of the circuits illustrated and described which are within the spirit and scope of the invention will be apparent to persons skilled in the art.

What is claimed is:

1. A circuit for producing delayed control of a device, comprising a gas discharge tube, a starting switch for said control circuit, a firing circuit for said tube operatively energized by operation of said switch, means in said firing circuit for introducing a predetermined delay in the firing operation, means responsive to the firing of said tube to produce the desired control of said device and to disable said firing circuit, and means responsive to the release of said switch to immediately restore said tube to the unfired condition so as to terminate the control of said device.

2. A circuit for producing delayed control of a switching device, comprising a source of potential, a gas discharge tube having a control circuit including a resistor and a capacitor which when charged to a given potential causes trigger operation of said tube, a switch, means responsive to the actuation of said switch to a certain position to connect said source across said resistor and said capacitor so as to cause the slow charging of said capacitor to said given operating potential to operate said tube, means substantially immediately responsive to the operation of said tube to produce the desired control of said switching device and to disable said control circuit so as to enable the discharge of said capacitor, and means effective when said switch is operated to another position to restore said tube to the unoperated condition so as to immediately terminate the control of said switching device and to enable said control circuit.

3. In combination with a device to be actuated with a given amount of delay, a gas discharge tube having a control discharge gap and a main discharge gap, a control circuit including a capacitor connected across said control discharge gap, a resistor, a source of potential the magnitude of which exceeds the ionization potential of said control discharge gap, a starting switch which in the operated condition connects said source through said resistor across said capacitor to start the slow charging of the latter from said source, the breakdown of said control gap when the voltage applied thereacross by the charged capacitor exceeds said ionization potential, in turn, causing the breakdown of said main gap to complete operation of said tube, switching means substantially immediately responsive to the operation of said tube to actuate said device, and to cause said capacitor to discharge, and means responsive substantially immediately to the release of said switch to restore said tube to the deionized condition and thus to release said switching means causing termination of the actuation of said device, the values of said capacitor and resistor in said control circuit being selected to provide said given delay in the actuation of said device.

4. In combination with a device to be actuated with a given amount of delay, a cold cathode gas discharge tube having a control discharge gap and a main discharge gap, a capacitor connected across said control discharge gap, a resistor, a battery the voltage of which exceeds the ionization potential of said control discharge gap, a switch which in one operated position closes a protective short-circuit across said control gap and in another operated position removes said protective short-circuit and connects said battery through said resistor across said capacitor to start the gradual charging of the latter to the potential of the battery, the breakdown of said control gap by the applied voltage when the charge (or voltage) on said capacitor reaches a given value causing, in turn, the breakdown of said main discharge gap to completely operate said tube, relay means responsive substantially immediately to operation of said tube to actuate said device, to disable the charging circuit for said capacitor and to start its discharge and means responsive to the return of said switch to said other operated position to restore said tube to the unoperated condition with the consequent release of said relay means to terminate the actuation of said device, and to cause said capacitor to be completely discharged, said given delay in the actuation of said device being obtained by proper selection of values for said capacitor and said resistor to produce the necessary delay in the charging of the former to said given value at which the control gap of said tube breaks down.

5. A pulsing system comprising a gas discharge tube, a switch, a battery, a first relay means, a firing circuit for said tube adapted to be energized from said battery to fire said tube in the operated condition of said switch only if said first relay means is in the normal released condition, means in said firing circuit for introducing a predetermined delay in the firing operation, a second relay means substantially immediately operatively responsive to the firing of said tube to lock itself in the operated condition and to restore said tube to the unfired condition and a second gas discharge tube having a firing circuit including means for introducing a predetermined delay in the firing operation, adapted to be energized from said battery when said second relay means operates, said first relay means being substantially immediately operatively responsive to the firing of said second tube to cause the release of said second relay means, means responsive substantially immediately to the release of said second relay means to restore said second tube to the unoperated condition, the restoration of said second tube to the unoperated condition causing the release of said first relay means to recondition the firing circuit of said first tube for energization from said battery to repeat the above cycle of operations if said switch remains operated, said second relay means being thus alternately operated and released for time intervals respectively proportional to the delays introduced in the firing operations for the two tubes.

6. The pulsing system of claim 5, in which each gas discharge tube is of the cold cathode type having a control discharge gap and a main discharge gap and the firing circuit of each tube includes a resistor, and a capacitor shunted across the tube control discharge gap, the capacitor in the firing circuit of said first tube being slowly charged through the associated resistor by the current from said battery to the potential which will cause the firing of said one tube when said switch is in the operated condition and said first relay means is in the normal released condition, the capacitor in the firing circuit for said second tube being slowly charged through the associated resistor to the potential which will cause the firing of said second tube when said switch and said second relay means are both in the operated condition, the time interval for which said second relay means remains operated and released being determined by the resistance and capacitance values selected for the resistor and capacitor in the firing circuit of said one and second tubes, respectively.

DONALD M. TERRY.